Dec. 20, 1960  H. ADLER  2,964,994
MICROFILM CAMERA
Filed June 17, 1957  3 Sheets-Sheet 1
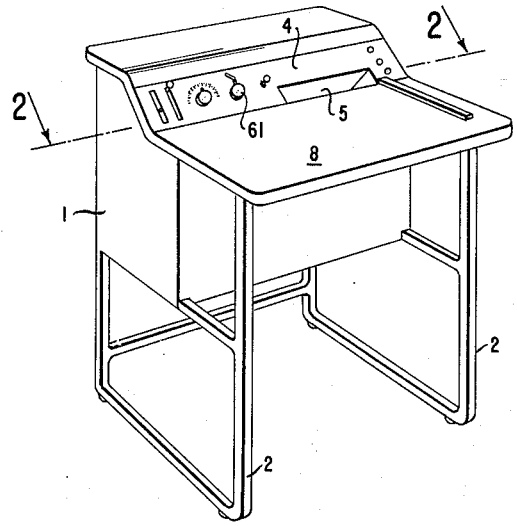
Fig. 1
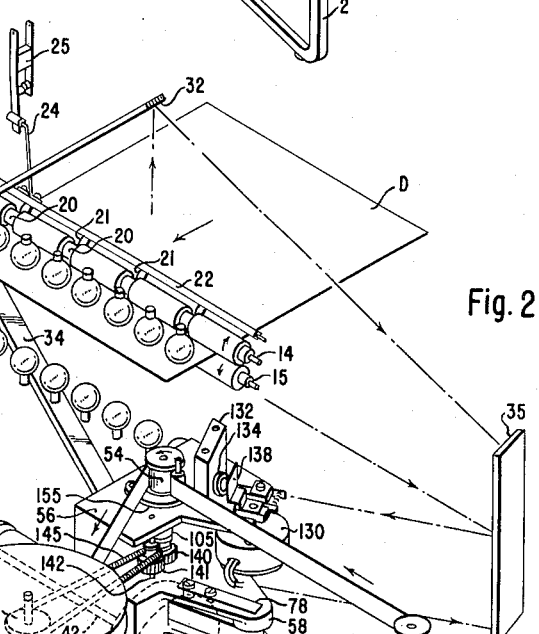
Fig. 2
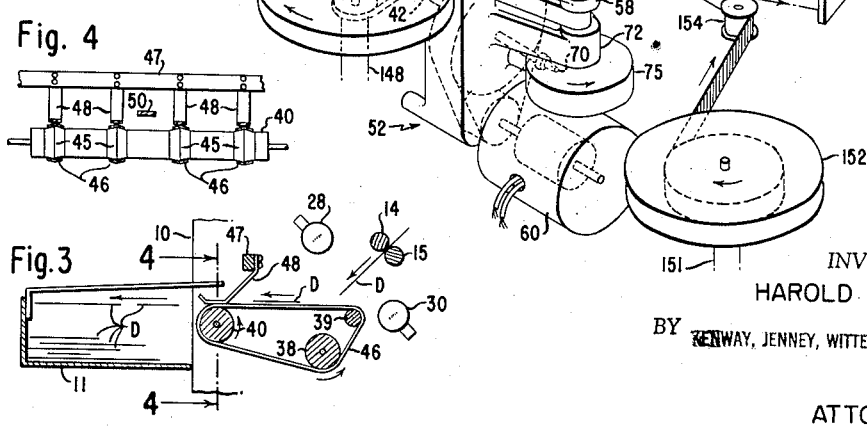
Fig. 4
Fig. 3
INVENTOR.
HAROLD ADLER
BY KENWAY, JENNEY, WITTER & HILDRETH
ATTORNEYS

INVENTOR.
HAROLD ADLER
BY KENWAY, JENNEY, WITTER & HILDRETH

ATTORNEYS

Dec. 20, 1960  H. ADLER  2,964,994
MICROFILM CAMERA
Filed June 17, 1957  3 Sheets-Sheet 3

INVENTOR.
HAROLD ADLER
BY KENWAY, JENNEY, WITTER & HILDRETH
ATTORNEYS

United States Patent Office 2,964,994
Patented Dec. 20, 1960

2,964,994
MICROFILM CAMERA

Harold Adler, Huckleberry Hill, Lincoln, Mass.

Filed June 17, 1957, Ser. No. 666,089

9 Claims. (Cl. 88—24)

This invention relates to a microfilm camera of the type capable of photographing one or both sides of a document. In cameras of this type the feed rolls for the document to be photographed must be synchronized with the speed of the film and it is therefore highly desirable to drive such feed rolls and associated mechanisms continuously in order to avoid starting and stopping, but the film must only be fed when the document is passing through the feed rolls of the camera. Hence, provision must be made both for quickly arresting the feeding of the film when a document leaves the feed rolls, as well as for immediately releasing the film when an oncoming document enters the bite of the feed rolls. Conventional friction type brakes have not proved generally satisfactory since they cannot be relied upon either to stop the film feeding rolls or permit them to resume normal speed, within the time allowed which is but a fraction of a second.

A further difficulty encountered in such cameras is that they must be used to photograph documents of various sizes, usually ranging from the size of a check or small slip of paper to legal size sheets. After having been photographed the document is projected or conveyed into a receiving tray from which they are later removed. Little or no difficulty is usually encountered with large sheets of average weight, but with a small sheet and flimsy paper, such as onion skin, the photographed sheet is apt to be misdirected or become tangled causing the following sheets to pile up so that they eventually interfere with the photographing operation.

The principal objects of the present invention are to overcome the aforementioned difficulties and to provide a camera capable of photographing one or both sides of a document, regardless of size. More specific objects are to provide a camera having an efficient and reliable clutch-brake mechanism that operates virtually instantaneously, thereby assuring proper photographing and the use of a minimum quantity of film, and to provide a conveyor system which insures the removal of documents from the camera and their deposit into a tray or the like holder in proper order.

Further objects relate to various features of construction and will be apparent from a consideration of the following description and the accompanying drawings, wherein:

Fig. 1 is a perspective view of a microfilm camera constructed in accordance with the present invention;

Fig. 2 is a schematic view approximately on the line 2—2 of Fig. 1;

Fig. 3 is a vertical section through the conveyor system and associated parts;

Fig. 4 is a section on the line 4—4 of Fig. 3;

Figure 5:
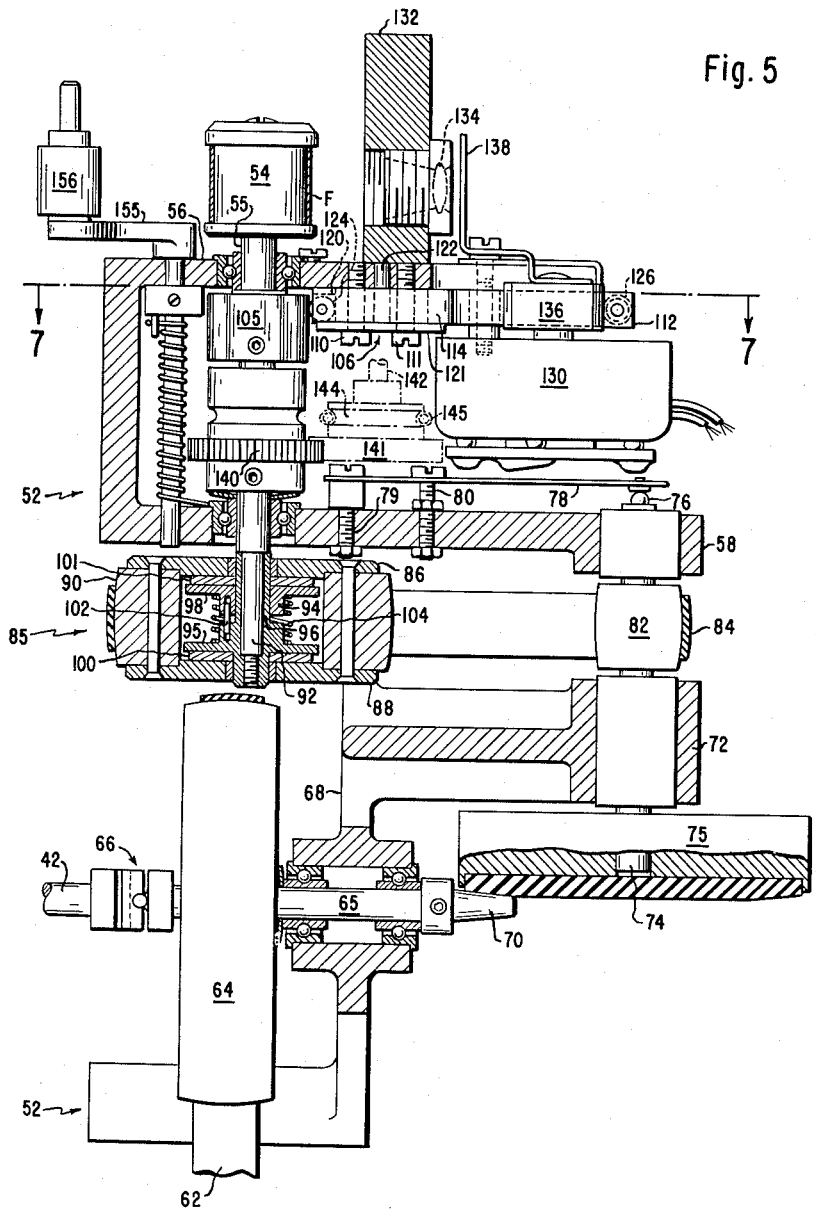
Fig. 5 is an elevation, partly in section, of the clutch-brake mechanism and associated parts.

In accordance with the present invention I provide a microfilm camera having continuously driven feed rolls for feeding a sheet or document through an illuminated photographic field so that one or both sides may be photographed. The optical system includes reflectors, one or more lenses and a shutter interposed between the lens and reflectors, the parts being arranged so as to project the image through the lens and onto a film extending about a capstan only when the shutter is open. The capstan is driven at a speed synchronized with that of the feed rolls and when the sheet or document has been photographed it passes onto a conveyor which deposits it in a tray or other suitable receptacle.

The drive means for the capstan is associated with a brake which is operative not only to arrest movement of the capstan when the document passes from the photographic field, but also to release the capstan virtually instantaneously when a document is fed into the photographic field. To this end the supporting shaft for the capstan carries the driven part of a clutch and between the clutch and capstan is a brake drum. Juxtaposed to the brake drum is a movable member having a surface which defines, with the adjacent surface of the brake drum, relatively convergent surfaces between which is disposed a roller such as a ball bearing. The roller is movable from a braking position, wherein it is wedged between the convergent surfaces so as to lock the drum against rotation, to a released position, wherein it releases the wedging action so as to permit the drum to rotate.

The movable member and roller carried thereby are normally held in braking position by any suitable means such as a spring so that the capstan is normally locked against rotation, and means are provided to operate in response to the opening of the shutter so as to move the movable member and roller to released position, thus permitting the capstan to feed the film past the lens to produce a microphotograph of the document passing through the photographic field.

The advantages of employing a roller in conjunction with relatively convergent surfaces are that the magnitude of movement of the roller from braking to released position is but a few thousandths of an inch, which requires but a small fraction of a second, and the force or energy required to arrest the movement of the drum and capstan is supplied by the parts already in motion, as distinguished from an outside source such as a spring and associated trip. Moreover, the locking or braking action is quite positive as in the case of the over running or roller clutch and because of the positive locking action and the minute movement of the roller from one position to the other, application of the brake and its release is virtually instantaneous.

When the document passes from the photographic field it drops or is projected onto a conveyor which comprises rolls carrying a plurality of spaced belts, each having a depending resilient finger extending in the direction of travel of the belt with its end portion in contiguous relation thereto so as gently to hold the document on the conveyor, thus overcoming any possibility that the document will be displaced. The conveyor projects the document into a receiving tray and in order to overcome the possibility of a small paper or a flimsy sheet from being misdirected there is provided a guard arm which extends inwardly and terminates above the upper run of the conveyor belts. Hence, the documents or papers delivered to the tray are in the same order in which they were fed through the camera.

In addition to the foregoing the apparatus may be provided with controls, indicators, etc., such as a film supply indicator, film guard, illumination rheostat for various shades of paper, out-of-film alarm or signal, etc. Hence, when the main switch is closed, the operator merely feeds the papers or documents into the entrance, after which they are automatically photographed and ejected into the receiving tray in the same order in which they were fed.

Referring to the drawings, the numeral 1 designates a housing supported by legs 2 and its top wall 4 is formed with an elongate horizontal slot or entrance 5 for receiving a paper such as documents D to be photographed. The lower edge of the top wall is integral with an extension 8 which provides a table or bench on which the documents to be photographed may be conveniently held and the rear wall 10 (Fig. 3) is formed with an exit opening through which the photographed documents are projected into a receiving tray 11. The interior of the housing is divided into three compartments, namely, a compartment housing the photographic field including the reflectors and light bulbs, a light proof compartment housing the photographic film and capstan, and an intermediate compartment housing the operating mechanism.

The compartment housing the photographic field communicates with the entrance and exit openings at the front and rear of the apparatus, and at the inner end of the entrance opening there are mounted upper and lower feed rolls 14 and 15 (Fig. 2), the lower feed roll having an extended shaft 16 which carries a pulley 18. The upper roll is formed with spaced circumferential grooves 20 which accommodate the sensing fingers 21 of a pivoted switch bar 22 connected by a link 24 with a switch 25. The construction and arrangement of parts are such that when the leading edge of the document D enters the bite of the feed rolls the fingers 21 are swung upwardly to rock the bar 22 and close the switch 25, and when the trailing edge of the document clears the feed rolls the fingers 21 swing downwardly, either by gravity or a spring (not shown), so as to open the switch 25.

Mounted above and below the path of travel of the documents, shown by the arrows in Fig. 3, are two banks of electric light bulbs 28 and 30 arranged to illuminate both sides of the document D, it being understood that if only one side of the document is to be photographed then the bank of lights adjacent thereto is used. Inclined mirrors or reflectors 32 and 34 (Fig. 2), associated with the lights, are so arranged as to reflect the image through slots in the partition separating the photographic field compartment and the intermediate compartment onto a third mirror or reflector 35 mounted in the latter compartment.

Below the path of travel of the documents through the photographic field is a conveyor comprising three spaced rolls 38, 39 and 40 (Figs. 2, 3 and 4) rotatable on parallel axes, the roll 38 being fixed to a shaft having extended ends 41 and 42. The end portion 41 carries a pulley 43 which is connected by a belt 44 with the pulley 18, and the end portion 42 is connected in the manner hereinafter described with an electric motor disposed within the intermediate compartment. Each of the rolls carries a plurality of spaced circumferentially extending bands 45 of V-shaped cross section, over which a plurality of thin belts 46 travel.

Mounted on a cross piece 47 above each band on the exit roll 40 is a depending resilient finger 48 having an end portion contiguous to the adjacent band 45 and extending in the direction of travel of the document. Secured to the end wall of the tray 11 and extending inwardly through the exit opening is a guard arm 50, the free end of which terminates above the ends of the fingers 48. The construction and arrangement of parts are such that a photographed document is projected onto the belts of the conveyor which carry it outwardly through the exit and project it into the tray 11, the fingers 48 being effective to hold the document properly positioned and the guard 50 being effective to prevent it from accidentally being projected out of the tray.

Mounted within the intermediate compartment is a frame 52 which carries the operating mechanism for the capstan, the associated drives and the shutter operating solenoid. The capstan 54 is disposed within the film compartment and is fixed to the upper end of a shaft 55. The upper part of the shaft 55 is mounted in a ball bearing carried by a web 56 and its inner end portion is mounted in another bearing carried by the web 58, the webs 56 and 58 constituting a part of the frame 52 and the web 56 being contiguous to the partition (not shown) separating the film compartment from the intermediate compartment.

Mounted in the lower part of the intermediate compartment is a driving motor 60 (Fig. 2) which is suitably connected in an electric circuit having a control switch 61 (Fig. 1). The shaft of the motor 60 carries a pulley which is connected by belt 62 (Fig. 5) with a weighted pulley 64 which not only provides a transmission element, but also a flywheel. The inner end of the pulley shaft 65 is fixed to the driving disk of an Oldham coupling 66 and the driven disk of this coupling is connected to the extended inner end 42 of the shaft of conveyor roll 38 which projects through an opening in the partition separating the photographic field and intermediate compartments.

The outer end portion of the pulley shaft 65 is mounted in spaced bearings carried by a web 68 constituting a part of the frame 52 and secured to the end of this shaft is a conical drive member 70. Mounted in bearings carried by the web 58 and an arm 72 integral with the web 68 is a shaft 74 (Fig. 5), the lower end of which carries a friction disk 75 having a beveled surface to produce a line contact with the driving cone 70, it being understood that the construction and arrangement of parts are such that the axes of the cone and shaft intersect. The upper end of the shaft 74 is recessed to receive a ball bearing 76 against which a leaf spring 78 acts to produce a downward thrust on the shaft. The inner end of the spring 78 is secured in spaced relation to the web 58 by a screw 79 and between the ends of the spring is an adjusting screw 80 by means of which the thrust on the shaft 74 may be varied.

Mounted on the shaft 74 between the web 58 and arm 72 is a pulley 82 (Fig. 5) which is connected by a belt 84 with a slip clutch 85, here shown as comprising spaced outer disks 86 and 88 separated by an annular member 90 over which the belt 84 travels, these parts being rigidly secured by rivets or other suitable means. The disks 86 and 88 are provided with central openings which receive the reduced inner end 92 of the capstan shaft 55. Extending about the reduced end 92 is a sleeve 96 the inner end of which is integral with a flange 95, and slidably mounted on the sleeve 96 is a collar 94 integral with a flange 98. Between the flange 95 and disk 88 is a friction plate or disk 100, and between the flange 98 and disk 86 is a second friction plate or disk 101. The sleeve 96 and collar 94 are keyed together by a pin 102 which permits relative axial movement of these parts and a compression spring 104, circumposed about the sleeve and collar, acts against the flanges 95 and 98 to urge them axially in opposite directions against the friction disks 100 and 101 which are pressed against the inner faces of the disks 86 and 88. The construction and arrangement thus described provide a slip or friction clutch which is effective to drive the capstan at a uniform rate, so long as there is no appreciable restraining force on the shaft 55, but when an appreciable restraining force is applied to the shaft, the clutch will slip so that the capstan and parts driven thereby do not rotate.

Figure 7:
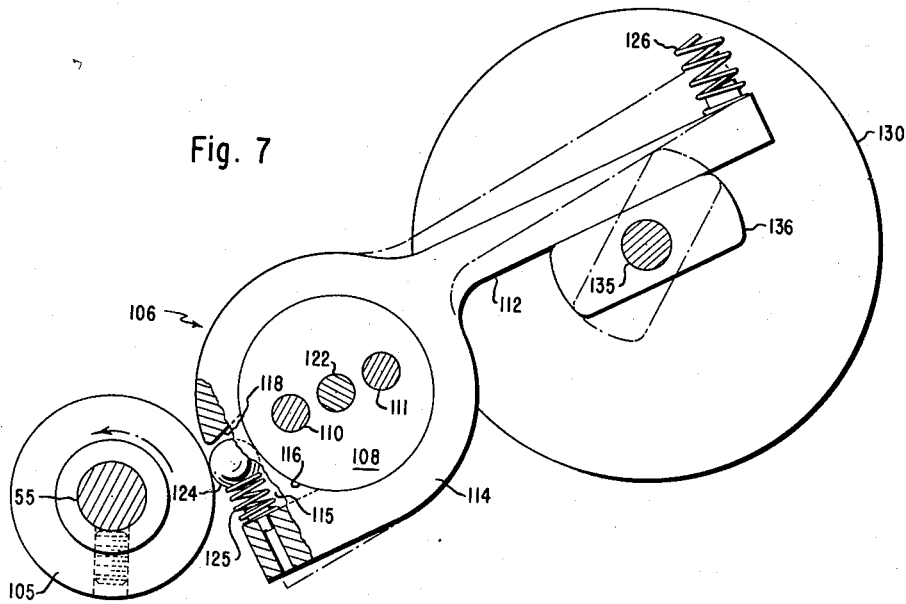
Fig. 7 is an enlarged section on the line 7—7 of Fig. 5.

Mounted on the capstan shaft 55 in closely spaced relation to the inner face of the web 56 is a brake drum 105 and mounted on the underside of the web 56 is a brake actuating mechanism 106 (Figs. 5 and 7). This mechanism comprises a circular pivot plate 108 of appreciable thickness which is secured to the web 56 by screws 110 and 111, and rotatably mounted on the plate is a brake arm or lever 112 having a generally annular shaped inner portion or hub 114 fitting about the pivot plate 108. The periphery of the hub adjacent to the brake drum 105 is recessed as indicated at 115 (Fig. 7) to expose a part of the outer peripheral surface 116 of the pivot plate which, with the periphery of the drum 105, provide relatively convergent surfaces. One wall of the recessed area is slightly undercut, as indicated at 118, to provide a nose and the sides of the recess are closed by a fillet 120 (Fig. 5) and a closure plate 121 which carries a pivot pin 122 extending through the plate 108 into the web 56.

Figure 6:
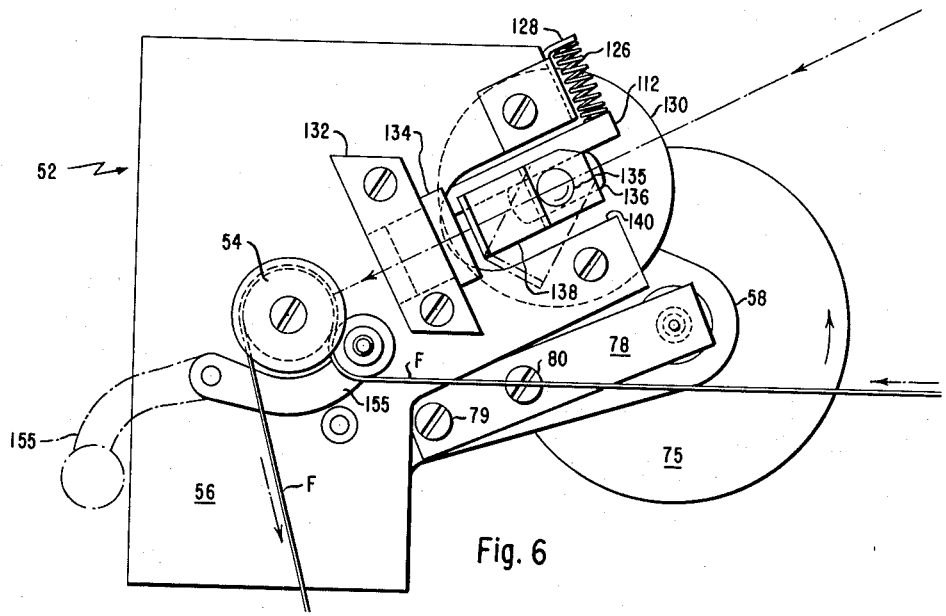
Fig. 6 is a top plan view of the mechanism shown in Fig. 5.

Mounted within the recess 115 is a roller 124, here shown as a ball bearing having a diameter slightly greater than the shortest distance between the convergent surfaces and seated within the recess is a compression spring 125 which acts on the roller 124 so as to urge it toward both convergent surfaces. The arm 112 is normally held in braking position by a compression spring 126, one end of which acts on the free end of the arm and its other end acts on a fixed bracket 128 secured to the web 56 (Fig. 6). With this construction and arrangement of parts the drum 105 rotates as indicated by the arrow in Fig. 7, and the roller 124 is urged, not only by the spring 125 but also by the rotation of the drum, into braking or locking position wherein the roller is wedged between the convergent surfaces so as positively to restrain rotation of the drum; but when the arm 112 is swung counterclockwise (Fig. 7) the nose 118 engages the roller 124 to move it to released position, wherein it disengages one or both of the convergent surfaces. It is apparent that the magnitude of the movement of the roller from one position to another is but a few thousandths of an inch and the time required to effect such a movement is correspondingly small so that for all practical purposes the movement of the roller from one position to the other may be considered as instantaneous.

Since the opening and closing of the camera shutter and the stopping and starting of the capstan must be accomplished simultaneously, the same actuating means is employed, here shown as a conventional rotary solenoid 130 mounted on the underside of the web 56 and electrically connected with the switch 25. Mounted on the upper part of the web 56 is a block 132 which carries a lens 134 aligned with the capstan 54 and reflector 35 so as to project the image onto the film F being driven by the capstan. The pintle 135 (Fig. 7) of the solenoid 130 carries an arm 136 engageable with the arm 112 so as to swing it from braking position, shown in the full lines of Fig. 7, to released position, shown by the broken lines in Fig. 7.

Mounted on the capstan shaft 55 between the brake angular-shaped shutter 138 (Figs. 2, 5 and 6) which projects through a recess 140 (Fig. 6) formed in the web 56. When the solenoid 130 is energized by the closing of the switch 25 it not only swings the arm 112 counterclockwise (Fig. 7) to release the braking action on the drum 105, but also swings the shutter clockwise, as shown by the broken lines of Fig. 6; and when deenergized by the opening of the switch 25 the parts are restored to normal position shown by the full lines of Figs. 6 and 7.

Mounted on the capstan staff 55 between the brake drum 105 and web 58 is a gear 140 (Figs. 2 and 5) meshing with a gear 141 carried by a stub shaft 142 depending from the web 56. The hub of the gear 141 is formed with a circumferential groove providing a pulley 144 which is connected by a spring belt 145 with a pulley 146 (Fig. 2) on the shaft 148 of a wind up reel 150. The shaft 148 for the wind up reel 150 and the shaft 151 for the supply reel 152 are disposed in the film compartment, together with a guide pulley 154, the capstan 54 and a spring loaded presser arm 155 (Fig. 5) having a roller 156 engageable with the film to hold it tightly against the capstan so as to avoid slippage. The release of the brake in response to the closing of the switch 25 allows the motor 60 to rotate the capstan which draws film from the supply reel 152 about the guide pulley 154 and past the lens 134. When the exposed portion of the film disengages the capstan the wind up reel takes over and this reel is driven at a greater peripheral speed than that of the capstan so that a reasonably tight wind is had, it being understood that the belt 145 permits compensating slippage as the film builds up on the wind up reel. When the solenoid 130 is deenergized the rotary movement of the capstan is immediately arrested and feeding of the film is stopped.

A summary of the operation of the apparatus is as follows: Assuming that the reel 152 contains an adequate supply of unexposed film, the leader of which has been passed about the guide pulley 154, capstan 54 and caught about the wind up reel 150, that the switch 61 has been closed to turn on the motor 60 and lights 28 and 30, and that the tray 11 is properly positioned, the motor 60 acting through belt 62, pulley 64 and coupling 66 continuously rotates the conveyor roll 38 which in turn acts through pulley 43 and belt 44 to drive the feed rolls 14 and 15 and at the same time the cone drive 70—75 continuously rotates the driving disk 86—88 of the slip clutch 85, but rotation of the capstan 54 is restrained by the action of the brake. When the operator feeds a document D into the entrance 5 its leading edge strikes the feed rolls and as it enters the bite of these rolls the finger 21 swings upwardly causing the switch 25 to close, whereupon the solenoid 130 operates to swing the shutter to open position and simultaneously releases the brake drum 105. A driving connection to the capstan 54 is now established and film F is drawn past the lens 134 at a rate synchronized with the rate of travel of the document through the photographic field. When the trailing end of the document D clears the bite of the feed rolls the fingers 21 swing downwardly, thereby opening the switch 25 and deenergizing the solenoid, whereupon the spring 126 comes into action to swing the arm to braking position so as to arrest further rotation of the capstan. However, the motor 60 continues to drive the feed and conveyor rolls and the cycle is repeated when another document is fed through the entrance 5.

Although the particular apparatus herein shown is designed for manual feeding operation, it will be noted that an automatic feed could be employed and it is to be understood that this disclosure is for the purpose of illustration and that various changes and modifications may be made without departing from the spirit and scope of the invention as set forth in the appended claims.

I claim:

1. In a microfilm camera having feed rolls for feeding a sheet through an illuminated photographic field and a shutter operative in response to the passage of a sheet through said field to permit the image to be projected through a lens onto a film extending about a capstan, a control means for driving said capstan in synchronized relation to said feed rolls and for arresting movement of said capstan when said sheet passes beyond said photographic field, said control means comprising a shaft rotatably supporting said capstan, a rotary clutch having a driven part fixed to said shaft, a brake drum fixed to said shaft between said clutch and capstan, means for rotating said capstan at a predetermined speed, a movable member having a surface juxtaposed to said brake drum and defining therewith spaced relatively convergent surfaces, a roller disposed between said convergent surfaces and movable from a braking position, wherein it is wedged between said surfaces so as to lock said drum against rotation, to a released position, wherein it exerts no wedging action, so as to permit said drum to rotate, means normally holding said roller in braking position, and means operative in response to the opening of said shutter for moving said member so as to cause said roller to move to released position.

2. In a microfilm camera having a motor for continuously operating feed rolls for feeding a sheet through an illuminated photographic field and a solenoid operated shutter operative in response to the passage of a sheet through said field to permit the image to be projected through a lens onto a film extending about a capstan, control means for driving said capstan in synchronized relation to said feed rolls and arresting movement of said capstan when said sheet passes beyond said photographic field, said control means comprising a shaft rotatably supporting said capstan, a rotary clutch having a driven part fixed to said shaft, a brake drum fixed to said shaft between said clutch and capstan, means for rotating said capstan at a predetermined speed, a movable member having a curved surface juxtaposed to said brake drum and defining therewith spaced relatively convergent surfaces, a ball bearing disposed between said convergent surfaces and movable from a braking position, wherein it is wedged between said surfaces so as to lock said drum against rotation, to a released position, wherein it exerts no wedging action, so as to permit said drum to rotate, means normally holding said ball bearing in braking position, and means operative in response to the operation of the solenoid for moving said member so as to cause said ball bearing to move to release position.

3. In a microfilm camera having a motor for continuously operating feed rolls for feeding a sheet through an illuminated photographic field and a solenoid operated shutter operative in response to the passage of a sheet through said field to permit the image to be projected through a lens onto a film extending about a capstan, control means for driving said capstan in synchronized relation to said feed rolls and arresting movement of said capstan when said sheet passes beyond said photographic field, said control means comprising a shaft rotatably supporting said capstan, a rotary friction clutch having a driving part freely rotatable on said shaft and a driven part fixed to said shaft, a brake drum fixed to said shaft between said clutch and capstan, connections between motor and driving part for rotating said capstan at a predetermined speed, a movable member having a surface juxtaposed to said brake drum and defining therewith spaced relatively convergent surfaces, a roller disposed between said convergent surfaces and movable from a braking position, wherein it is wedged between said surfaces so as to lock said drum against rotation, to a released position, wherein it exerts no wedging action, so as to permit said drum to rotate, means normally holding said roller in braking position, and means operative in response to the operation of the solenoid for moving said member so as to cause said roller to move to released position.

4. In a microfilm camera having a motor for continuously operating feed rolls for feeding a sheet through an illuminated photographic field and a solenoid operated shutter operative in response to the passage of a sheet through said field to permit the image to be projected through a lens onto a film extending about a capstan, control means for driving said capstan in synchronized relation to said feed rolls and arresting movement of said capstan when said sheet passes beyond said photographic field, said control means comprising a shaft rotatably supporting said capstan, a rotary friction clutch having a driving part freely rotatable on said shaft and a driven part fixed to said shaft, a brake drum fixed to said shaft between said clutch and capstan, connections between said motor and driving part for rotating said capstan at a predetermined speed, a rotatable generally circular shaped member juxtaposed to said brake drum, said member having a peripheral recess with an inner wall defining with the periphery of said drum spaced relatively convergent surfaces, a roller disposed between said convergent surfaces and movable from a braking position, wherein it is wedged between said surfaces so as to lock said drum against rotation, to a released position, wherein it exerts no wedging action, so as to permit said drum to rotate, means normally holding said roller in braking position, and means operative in response to the operation of the solenoid for moving said member so as to cause said roller to move to released position.

5. In a microfilm camera having a motor for continuously operating feed rolls for feeding a sheet through an illuminated photographic field and a solenoid operated shutter operative in response to the passage of a sheet through said field to permit the image to be projected through a lens onto a film extending about a capstan, control means for driving said capstan in synchronized relation to said feed rolls and arresting movement of said capstan when said sheet passes beyond said photographic field, said control means comprising a shaft rotatably supporting said capstan, a rotary friction clutch having a driving part freely rotatable on said shaft and a driven part fixed to said shaft, a brake drum fixed to said shaft between said clutch and capstan, connections between said motor and driving part for rotating said capstan at a predetermined speed, a brake arm pivotally mounted on an axis parallel to that of said drum, one end of said arm being found with an enlargement juxtaposed to said drum, the peripheral portion of said enlargement adjacent to said drum having a recess with a bottom wall defining with the periphery of said drum relatively convergent surfaces, a roller disposed between said convergent surfaces and movable from a braking position, wherein it is wedged between said surfaces, to a released position, wherein it exerts no wedging action, so as to permit said drum to rotate, the other end of said arm extending to a position adjacent to said solenoid, means acting on said other end so as normally to hold said arm so that said roller is in braking position, and connections between said arm and solenoid operative to rotate said arm so as to move said roller to released position in response to the operation of said solenoid.

6. A camera as set forth in claim 1, wherein resilient means is provided to urge said roller toward braking position.

7. A camera as set forth in claim 2, wherein said ball bearing is supported by a compression spring and said curved surface is provided with a lug arranged to contact said ball bearing and force it to released position when said member is moved to released position.

8. A camera as set forth in claim 3, wherein said connections include a weighted pulley and a friction drive between said pulley and clutch.

9. A microfilm camera as set forth in claim 5, wherein a rotary solenoid is provided to actuate said shutter and simultaneously rotate said arm.

References Cited in the file of this patent

UNITED STATES PATENTS

| | | |
|---|---|---|
| 1,879,040 | Belluche | Sept. 27, 1932 |
| 2,177,135 | Fassel | Oct. 24, 1939 |
| 2,292,825 | Dilks | Aug. 11, 1942 |
| 2,478,641 | Rose et al. | Aug. 9, 1949 |
| 2,585,276 | Schubert et al. | Feb. 12, 1952 |
| 2,632,643 | Egan et al. | Mar. 24, 1953 |
| 2,719,714 | Pratt et al. | Oct. 4, 1955 |
| 2,747,462 | Jones | May 29, 1956 |

UNITED STATES PATENT OFFICE
CERTIFICATION OF CORRECTION

Patent No. 2,964,994                         December 20, 1960

Harold Adler

It is hereby certified that error appears in the above numbered patent requiring correction and that the said Letters Patent should read as corrected below.

Column 5, lines 56 and 57, strike out "capstan shaft 55 between the brake angular-shaped" and insert -- arm 136 is the lower wing of an angular-shaped --; line 66, for "staff" read -- shaft --.

Signed and sealed this 23rd day of May 1961.

(SEAL)
Attest:

ERNEST W. SWIDER                          DAVID L. LADD

Attesting Officer                            Commissioner of Patents